(12) United States Patent
Kurt-Elli

(10) Patent No.: US 6,959,688 B2
(45) Date of Patent: Nov. 1, 2005

(54) METHOD FOR MONITORING ENGINE ORDER FORCING FREQUENCY

(75) Inventor: Hilmi Kurt-Elli, Derby (GB)

(73) Assignee: Rolls-Royce plc, London (GB)

(*) Notice: Subject to any disclaimer, the term of this patent is extended or adjusted under 35 U.S.C. 154(b) by 0 days.

(21) Appl. No.: 10/831,107

(22) Filed: Apr. 26, 2004

(65) Prior Publication Data

US 2004/0230363 A1 Nov. 18, 2004

(30) Foreign Application Priority Data

May 16, 2003 (GB) .............................................. 0311239

(51) Int. Cl.$^7$ .............................................. F02B 75/02
(52) U.S. Cl. ........................ 123/319; 73/579; 73/570; 73/584; 73/116
(58) Field of Search ............................. 123/319, 192.1; 73/570, 579, 584, 116

(56) References Cited

U.S. PATENT DOCUMENTS 5,560,336 A * 10/1996 Takahashi et al. ..... 123/406.24
6,471,482 B2    10/2002 Montgomery
6,510,732 B1 *  1/2003 Liang et al. ................ 73/117.3

FOREIGN PATENT DOCUMENTS

GB          1353732 P       5/1974

* cited by examiner

Primary Examiner—Bibhu Mohanty
(74) Attorney, Agent, or Firm—W. Warren Taltavull; Manelli Denison & Selter PLLC

(57) ABSTRACT

A method of monitoring engine order forcing frequency comprises the steps of:

selecting at least one engine order for an engine, the engine order being related in a known manner to one or more engine vibration responses generated by the forcing of the engine order;

receiving measurement data which provide a measure of the change in the frequency of the or each vibration response as the engine speed varies, and calculating therefrom the change in the engine order forcing frequency; and determining, on the basis of the calculated change in the engine order forcing frequency, a corresponding change in at least one second engine order forcing frequency for the engine as the engine speed varies.

7 Claims, 4 Drawing Sheets

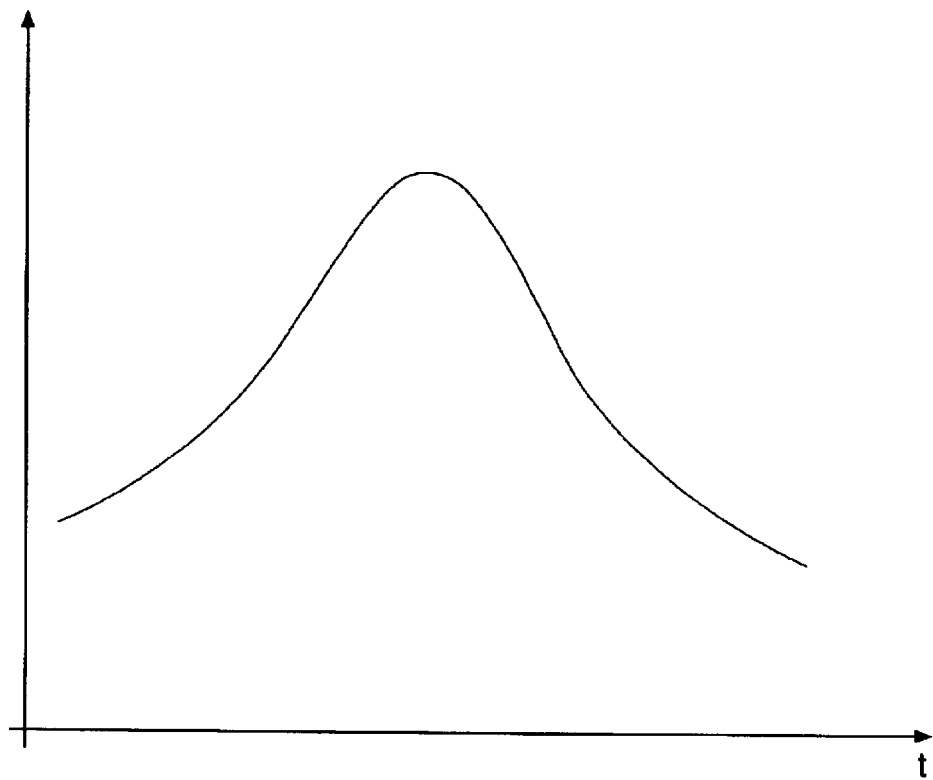

METHOD FOR MONITORING ENGINE ORDER FORCING FREQUENCY

FIELD OF THE INVENTION

The present invention relates to a method for monitoring engine order frequency.

BACKGROUND OF THE INVENTION

Engines with rotating components are subject to vibratory forces at frequencies which are related to the angular velocity of the respective component and hence engine speed. These frequencies are conventionally known as engine order forcing frequencies, each engine order corresponding to a rotational frequency of a particular component (or harmonic thereof) and exerting a corresponding vibratory force on the engine. Where there is gearing between components, non-integral engine order frequencies can arise, i.e. frequencies which are related to the primary component rotational frequency, but not necessarily by an integer number.

The forces may arise because e.g. an engine is out of balance on a particular shaft, stiffness irregularities in engine components, shaft mis-alignment, and (significantly in the case of gas turbine engines) aerodynamic interactions between the blades of the engine.

At a given engine speed, a number of these engine orders are generally active and result in corresponding vibration responses in the engine which are measurable e.g. as strains, velocities or accelerations. Each vibration response generally has approximately the same frequency as the engine order forcing frequency which generated it. For steady state conditions (e.g. constant speed), the frequencies will be the same. However, the relative phase between a vibration response and the corresponding engine order may change as the engine speed varies, and particularly when the engine order traverses a resonance frequency of the engine. Indeed, merely moving toward or away from such a resonance may cause the relative phase to change. In particular, under reasonably slow engine speed changes, engine order forcing frequencies and their corresponding vibration response frequencies tend to be very close, but usually varying sufficiently to allow some relative changes near resonances. On the other hand, the ratios between the engine order forcing frequencies generally remain constant as the engine speed varies.

Quantification of active engine order forcing frequencies and phase changes can be helpful for engine operators attempting to identify modes of vibration. These in turn may be useful for understanding engine behaviour, providing validation for engine models, and engine troubleshooting and "health" monitoring.

A conventional approach for determining engine order forcing frequencies is to measure engine component (e.g. shaft) rotational speeds directly using tachometer-like measuring devices. This approach is relatively simple in concept, but relies on being able to provide accurate and robust measuring devices and to appropriately position the devices in the engine. This may cause difficulties in practice.

The present invention is based, at least partly, on the realisation that known relations between engine order forcing frequencies and vibration response frequencies allow other engine order forcing frequencies, and optionally engine order/vibration response relative phase changes, to be determined indirectly from measurements of vibration responses.

SUMMARY OF THE INVENTION

In a first aspect, therefore, the present invention provides a method of monitoring engine order forcing frequency comprising the steps of:

selecting at least one (first) engine order for an engine, the engine order being related in a known manner to one or more (first) engine vibration responses generated by the forcing of the engine order;

receiving measurement data which provide a measure of the change in the frequency of the or each vibration response as the engine speed varies, and calculating therefrom the change in the engine order forcing frequency; and determining, on the basis of the calculated change in the engine order forcing frequency, a corresponding change in at least one further (second) engine order forcing frequency for the engine as the engine speed varies.

Thus identification of a first engine order which correlates in a known manner with one or more engine vibration responses generated by that engine order, allows the operator to determine second engine order forcing frequencies.

The or each vibration response may be obtained from the measurement data by filtering out the respective response component and computing the frequency with respect to time e.g. by performing a zero crossing type of analysis.

In typical embodiments, for example, in which the first engine forcing order frequency and the or each vibration response frequency are the same for the range of engine speeds under consideration, the phase difference between the first engine order and the vibration response remains substantially constant as the engine speed varies. The operator may be aware of this relation between first engine order and vibration response from past experience with the engine or he may be able to infer it e.g. if the first engine order is sufficiently distant from any engine resonance frequency.

In these embodiments, therefore, the variation of the first engine order forcing frequency with time can be calculated to be equivalent to the measurement of the response frequency as the engine speed varies. Furthermore, if the ratios between engine order forcing frequencies remain constant (or vary in a known manner) as the engine speed varies (which is generally the case), determination of the corresponding further engine order forcing frequency for the engine at a particular instant is simply a matter of applying the appropriate ratio to the first engine order forcing frequency.

Thus, advantageously the method allows engine order forcing frequencies to be monitored without the need for tachometer measurements. Indeed, for very high frequency engine orders, the method may be more accurate than tachometer-based approaches because of the higher time resolution that can be obtained.

In principle, the ratio (n/m) of the first engine order forcing frequency (n) to the or each second engine order forcing frequency (m) can take any value. However, preferably the first engine order forcing frequency is greater than (and more preferably at least two, five or ten times greater than) the or each second engine order forcing frequency. In general we have found that the greater the ratio between the first and second engine order forcing frequencies, the greater the degree of accuracy that can be obtained in the determination of the second engine order forcing frequency when an engine resonance frequency is at or close to the first engine order. This is because, in a given time interval, phase changes for the second engine order forcing frequency are generally determined by integrating the first engine order response frequency factored by (m/n). When the first engine order is close to a resonance frequency, the errors this would otherwise induce are reduced by the factor (m/n). However, there may be limits to realising an advantage based on a high (n/m) ratio. In particular, at high first engine orders there may be difficulties in effectively filtering the desired vibration response.

A plurality of first engine order response frequency orders may be selected. The second engine order forcing frequency may then be determined by taking an average of the (m/n) ratioed first engine order forcing frequencies. This tends to improve the accuracy of the method. For example, some of the first engine orders may have errors due to the proximity of engine resonances, filtering and extraneous signal noise. Averaging across first engine orders will tend to cancel out random errors. Furthermore, the average may be weighted e.g. by giving a heavier weighting to those first engine orders which are most distant from engine resonances. A possible weighting that could be adopted would be the ratio of the magnitude of the frequency separation between the engine order and the engine resonance relative to the engine resonance frequency. The weightings can be further improved if the damping of the respective engine resonance is known. For example, if the −3 dB bandwidth of the engine resonance is known, a suitable weighting might be the respective frequency separation relative to the bandwidth.

Similarly, by receiving measurement data corresponding to a plurality of first vibration responses, and e.g. taking an average of the response frequencies, the first engine order forcing frequency can be calculated more accurately. The average of the response frequencies may also be weighted, e.g. with weightings similar to those described above, but using the frequency separation between the vibration response and the engine resonance in place of the separation between the first engine order and the engine resonance. A further weighting may be in proportion to the signal-to-noise ratios of the measurement data for the vibration response frequencies.

In preferred embodiments the method comprises the further steps of:

receiving further measurement data which provide a measure of the changes in the frequencies of one or more (second) engine vibration responses generated by the forcing of the second engine order as the engine speed varies; and determining the relative phase change between the second engine order and the or each second engine vibration response as the engine speed varies.

For example, the relative phase change may be determined as a function of engine speed (or time or frequency).

These embodiments provide a convenient method of analysing relative phase shifts between the second engine order and the or each second engine vibration response caused by engine resonance frequencies at or close to the second engine order.

The or each second vibration response may be obtained from the further measurement data by filtering out the respective response component and computing the frequency with respect to time e.g. by performing a zero crossing type of analysis.

Determination of the total relative phase shift over a time period in which the engine speed varies may be performed by integrating with respect to time the difference between the second engine order frequency and the frequency of the or each second engine vibration response.

Preferably the engine is a gas turbine engine, and more preferably an aero gas turbine engine. However, the method may be applied to any engine with rotating components which exhibits engine order forcing. For example, the engine may be an internal combustion engine, such as an automotive vehicle power plant.

The method of the invention discussed above may conveniently be implemented in software, for execution on any appropriate digital computer including one or more memory devices for storing the measurement data and one or more processors for executing the method. The method may also be implemented on any appropriately configured "hard wired" device or apparatus.

Thus further aspects of the invention respectively provide a computer or linked computers operatively configured to implement the method of the previous aspect of the invention; computer programming product or products (such as ROM, RAM, floppy discs, hard drives, optical compact discs, magnetic tapes, and other computer-readable media) carrying computer code for implementing the method of the previous aspect of the invention; and a computer program per se for implementing the method of the previous aspect of the invention.

BRIEF DESCRIPTION OF THE DRAWINGS

An embodiment of the invention will be further described by way of example with reference to the accompanying drawings, in which:

FIG. 5 shows a plot against time of the magnitude of the 2EO vibration response.

DETAILED DESCRIPTION OF THE INVENTION

The following embodiment is based on simulated engine data. It is typical of the type of data that might be obtained from an aero gas turbine engine (either in service or on a test bed).

For clarity only two engine orders are discussed. The first engine order, 1EO, has a forcing frequency which is known to be twice that of the second engine order, 2EO. 1EO has a forcing frequency (in the range of engine speeds under consideration) in the range 120–128 Hz and 2EO lies in the range 60–64 Hz. Thus, over a time period in which the engine speed increases, 1EO and 2EO respectively increase from about 120 and 60 Hz to about 128 and 64 Hz. An engine resonance frequency lies in the range 60–64 Hz.

Figure 1A:
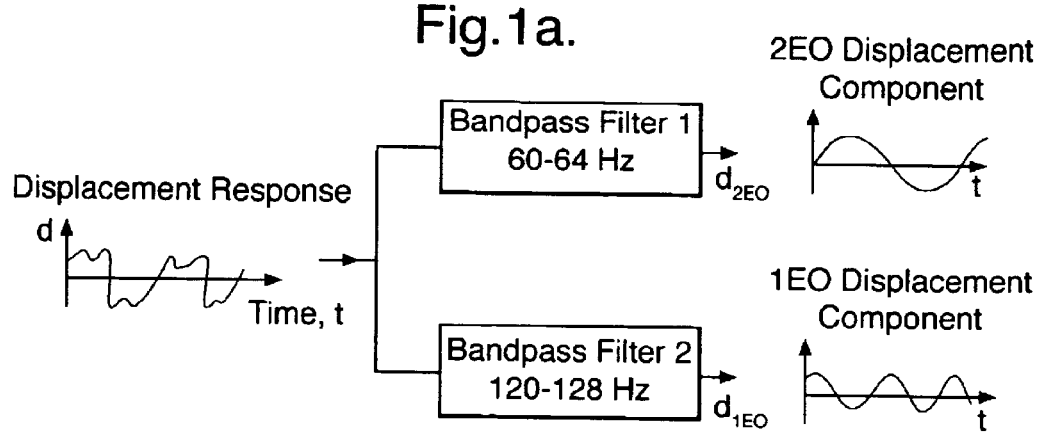
FIG. 1a shows a flow chart which demonstrates how engine vibration response data is analysed to obtain vibration response signals corresponding to the two engine orders 1EO and 2EO.

FIG. 1a shows a flow chart which demonstrates how engine vibration response data is analysed to obtain response signals corresponding to 1EO and 2EO. A mixed displacement signal caused by both engine orders is obtained from e.g. a strain gauge or accelerometer attached to the engine. This signal is subjected in parallel to two band pass filters operating in the respective frequency ranges of 1EO and 2EO. This results in respective vibration response signals corresponding to the two engine orders. In general, the band pass filters may have constant or time varying characteristics.

Figure 1B:
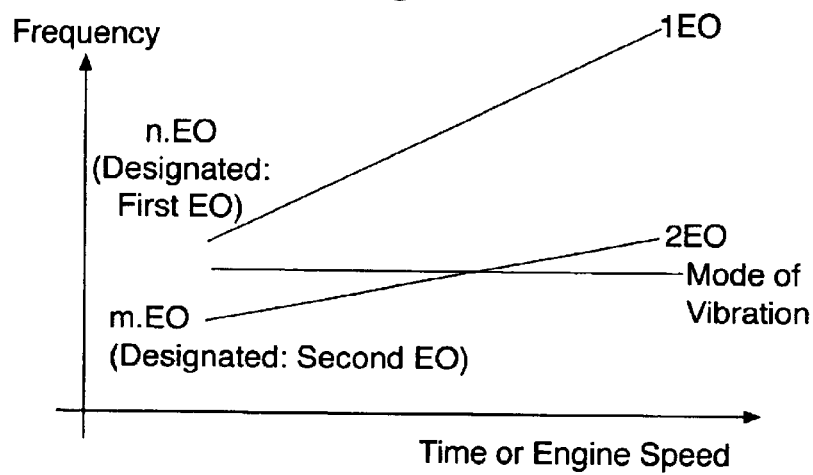
FIG. 1b shows the running spectrum of the data considered in FIG. 1a, FIG. 2a shows the vibration response corresponding to 1EO, the indicated time intervals, $\tau_i$, being used to calculate the frequency of the vibration response at respective instants.

The general characteristics of the measured signals are shown in the running spectrum (often called a waterfall or ZMOD plot) of FIG. 1b. Waterfall plots show how the magnitude of the short time averaged Fourier transform varies with time across engine manoeuvres. Vibration modes (e.g. engine resonances) respond not just at engine order frequencies but also asynchronously to other sources of excitation. At one time 2EO traverses the engine resonance while 1EO is remote therefrom.

Figure 2A:
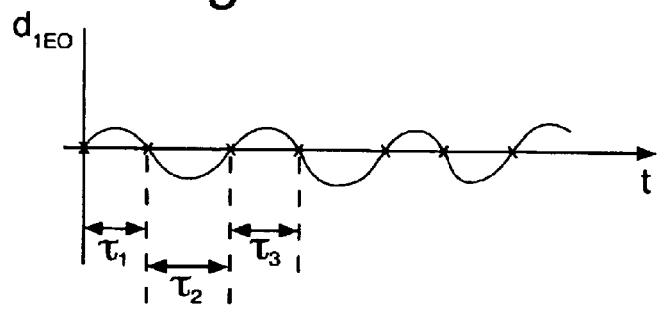
FIG. 2b shows a plot of 1EO forcing frequency against time generated from vibration response frequencies calculated from FIG. 2a, FIG. 2c shows a plot of 2EO forcing frequency against time generated from the plot of FIG. 2b.

As the engine speed increases with time the frequency of vibration response signals also increases. As shown in FIG. 2a for the 1EO vibration response signal, the frequency at a particular instant can be calculated e.g. by measuring the time intervals, $\tau_i$, for the vibration response to cross the zero datum line (or more precisely by measuring the average frequency between zero cross over instants). However, another approach would be to employ a curve fitting technique to assess frequency variation with time. Alternatively a frequency domain analysis could be performed where the variation of phase and thence frequency is computed.

Assuming it is known (e.g. because, for the engine speeds under consideration, 1EO is remote from any modes) that the 1EO vibration response frequency is identical or very close to the 1EO forcing frequency and that the phase of the vibration response does not vary relative to 1EO, then a plot of 1EO vibration response frequency against time is equivalent to a plot (shown in FIG. 2b) of 1EO forcing frequency against time.

Figure 2B:
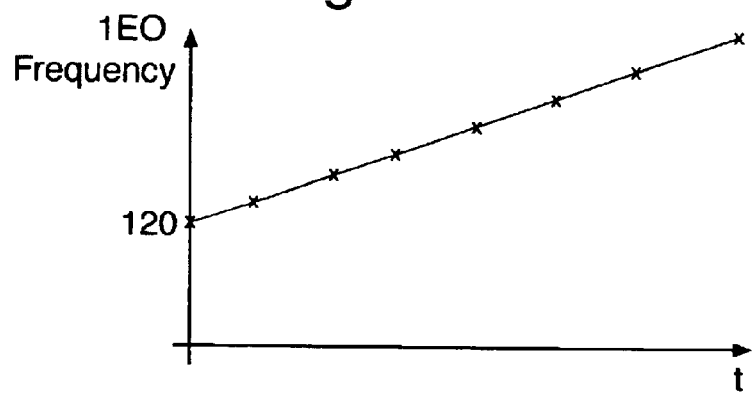
Figure 2C:
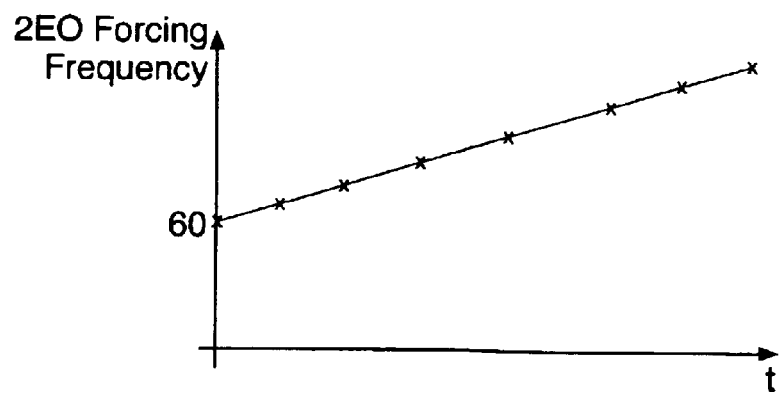

However, it is also known that the 1EO forcing frequency is twice that of 2EO, so dividing the frequency values of FIG. 2b by two leads to a plot (shown in FIG. 2c) of the 2EO forcing frequency against time.

Figure 3:
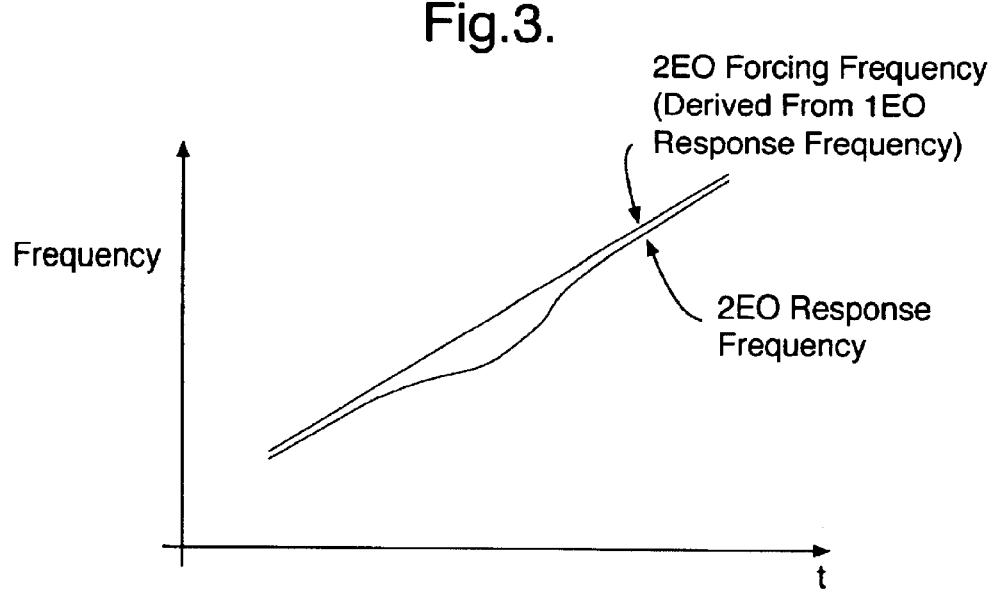
FIG. 3 shows a plot of frequency against time for the 2EO vibration response superimposed on the plot of FIG. 2c.

Next, the frequency of the 2EO vibration response signal against time is also calculated. This is then plotted on the same graph (see FIG. 3) as the plot of 2EO forcing frequency against time. The difference between the 2EO forcing frequency and vibration response frequency is indicative of a relative phase change between 2EO and vibration response caused by the engine resonance.

Figure 4:
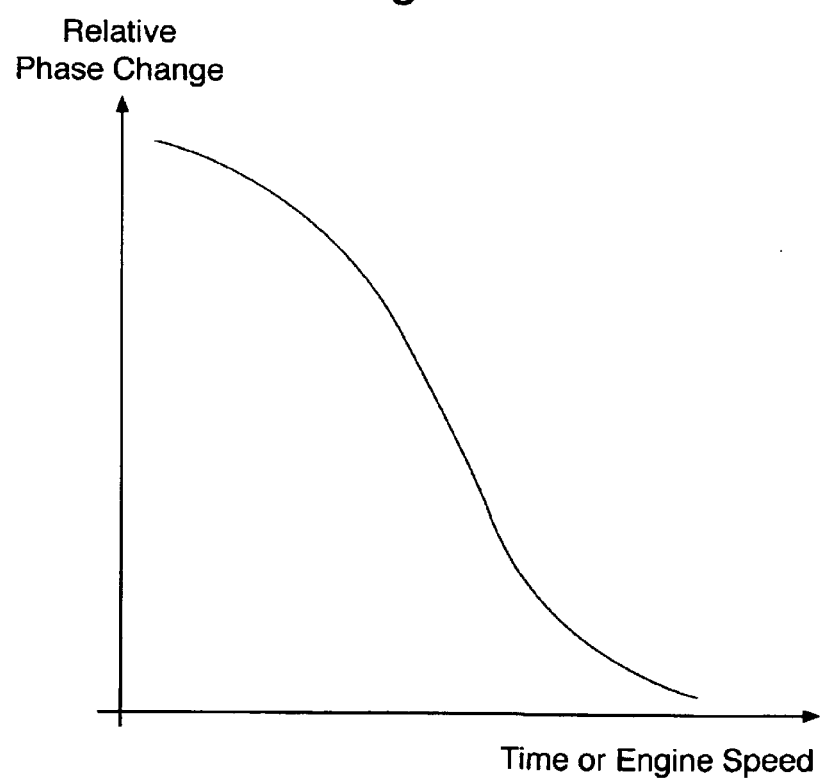
FIG. 4 shows a plot of the integral of the frequency difference of the 2EO forcing and response of FIG. 3, i.e. the change in relative phase with time.

Integration of the difference over time leads to the plot shown in FIG. 4 and provides a measure of the relative phase change between 2EO and the corresponding vibration response. FIG. 5 shows the magnitude of the 1EO vibration response. The magnitude and phase characteristics are useful in identifying modes.

Such identification improves understanding of engine behaviour, which in turn can benefit e.g. engine modelling and troubleshooting and "health" monitoring. The method also allows engine orders to be monitored and phase changes to be detected when tachometer signals are not available, inadequate or corrupted.

I claim:

1. A method of monitoring engine order forcing frequency comprising the steps of:
   selecting at least one engine order for an engine, the engine order being related in a known manner to one or more engine vibration responses generated by the forcing of the engine order;
   receiving measurement data which provide a measure of the change in the frequency of the or each vibration response as the engine speed vanes, and calculating therefrom the change in the engine order forcing frequency; and
   determining, on the basis of the calculated change in the first engine order forcing frequency, a corresponding change in at least one second engine order forcing frequency for the engine as the engine speed varies.

2. A method of monitoring engine order forcing frequency according to claim 1, wherein the first engine order forcing frequency is greater than the second engine order forcing frequency.

3. A method of monitoring engine order forcing frequency according to claim 1, comprising the further steps of:
   receiving further measurement data which provide a measure of the changes in the frequencies of one or more engine vibration responses generated by the forcing of the second engine order as the engine speed varies; and
   determining the relative phase change between the second engine order and the or each engine vibration response generated by the forcing of the second engine order as the engine speed varies.

4. A method of monitoring engine order forcing frequency according to claim 1, wherein the engine is a gas turbine engine.

5. A computer operatively configured to implement a method of monitoring engine order forcing frequency comprising the steps of:
   selecting at least one engine order for an engine, the engine order being related in a known manner to one or more engine vibration responses generated by the forcing of the engine order;
   receiving measurement data which provide a measure of the chance in the frequency of the or each vibration response as the engine speed varies, and calculating therefrom the change in the engine order forcing frequency; and
   determining, on the basis of the calculated change in the first engine order forcing frequency, a corresponding change in at least one second engine order forcing frequency for the engine as the engine speed varies.

6. A computer programming product carrying computer code on a tangible medium for implementing a method of monitoring engine order forcing frequency comprising the steps of:
   selecting at least one engine order for an engine, the engine order being related in a known manner to one or more engine vibration responses generated by the forcing of the engine order;
   receiving measurement data which provide a measure of the change in the frequency of the or each vibration response as the engine speed varies, and calculating therefrom the change in the engine order forcing frequency; and
   determining, on the basis of the calculated change in the first engine order forcing frequency, a corresponding change in at least one second engine order forcing frequency for the engine as the engine speed varies.

7. Computer code transcribed on a tangible medium for implementing a method of of monitoring engine order forcing frequency comprising the steps of:
   selecting at least one engine order for an engine, the engine order being related in a known manner to one or more engine vibration responses generated by the forcing of the engine order;
   receiving measurement data which provide a measure of the change in the frequency of the or each vibration response as the engine speed varies, and calculating therefrom the change in the engine order forcing frequency; and
   determining, on the basis of the calculated change in the first engine order forcing frequency, a corresponding change in at least one second engine order forcing frequency for the engine as the engine speed varies.

* * * * *